March 19, 1957 J. H. ASKEW 2,786,174
ELECTRIC SERVO MOTOR CONTROL SYSTEM
Filed Feb. 8, 1954 2 Sheets-Sheet 1

Inventor
Joseph H. Askew
By Ralph B. Stewart
Attorney

March 19, 1957  J. H. ASKEW  2,786,174
ELECTRIC SERVO MOTOR CONTROL SYSTEM
Filed Feb. 8, 1954  2 Sheets-Sheet 2

Inventor
Joseph H. Askew
By Ralph B. Stewart
Attorney

United States Patent Office 2,786,174
Patented Mar. 19, 1957

2,786,174

ELECTRIC SERVO MOTOR CONTROL SYSTEM

Joseph Hordon Askew, Teddington, England, assignor to Evershed & Vignoles Limited, London, England, a British company Application February 8, 1954, Serial No. 408,912

Claims priority, application Great Britain February 18, 1953

8 Claims. (Cl. 318—448)

This invention relates to electric motor control systems, and is particularly concerned with the control of small reversible direct current electric motors, such as motors which have to move under the control of an initiating signal or motors which have to rotate in either direction at an adjusted steady speed.

In the past, motor control systems of this kind have been used in which the motor is controlled and reversed by a contact-making relay which, when at rest, short-circuits the motor armature and which, upon slight movement in one direction or the other, connects the armature to a source of supply so that it rotates in the one direction or the other. In these systems, this is achieved by arranging the relay contacts to make on the one side before breaking on the other and in one very sensitive form of the apparatus, a roller contact is used which moves over two fixed contacts having a small gap between them. The requirements of such a system are mostly to arrange for very rapid response to an initiating or input signal and to avoid over-shooting or hunting on cessation of a signal. The contact-making relay employed is usually a centre-stable device, such as a centre-stable polarised electro-magnetic relay, but other forms of contact-making devices may be employed such as a moving coil relay.

Such a system has the disadvantage that the power supplied to the motor is violently non-linear and it is difficult to obtain smooth control of the motor. A method is known of rendering such a control system linear by causing the moving contact to vibrate or buzz at a high frequency and biasing or varying the time of dwell of the moving contact on one or the other of the fixed contacts, with the input signal. The present invention provides for the moving contact to be automatically maintained in a condition of self-vibration of very small amplitude by providing the contact-making relay with a feedback winding so connected that when the moving contact just breaks contact on one side, the feedback winding is energized in such a direction as to return the said contact on to the other side whereupon the sequence is repeated. As a result, when no signal is applied, the moving contact is predominantly in the central position but with a very small vibration or shake applied to it.

This is effected according to the invention, by connecting the feedback winding of the relay in circuit with the voltage across the motor brushes. When the moving contact is central and short-circuiting the motor armature, a current from a direct current source flows from the moving contact into both of the fixed contacts and through armature current limiting resistors. When, however, the moving contact touches on one fixed contact and before the motor starts, the voltage across the motor armature is the current drop in the resistance of the armature and this voltage is applied to the feedback winding of the relay, and opposes the original movement of the contact and causes it to return to the central position and overshoot whereupon the process is reversed. In some conditions with small motors such as are used for servo or follow-up mechanisms, it is found that this vibration of the moving contact may be at a frequency of 100 to 200 cycles per second. The result of this is that the moving contact is "alive" and in a condition to respond immediately to any initiating signal. Moreover, when the motor begins to run under the influence of the control signal, a voltage proportional to speed appears across the motor brushes as back electromotive force and thus across the feedback winding. The polarity of this voltage is such as to oppose the effect of the original signal and it acts as an anti-hunting signal such as is derived from a stabilising generator in a conventional control system; it thus prevents excessive over-shooting and hunting.

In order that the invention may be more fully understood and readily carried into effect, two examples of systems in accordance with the invention will now be more fully described with reference to the accompanying drawings, in which.

Figure 1:
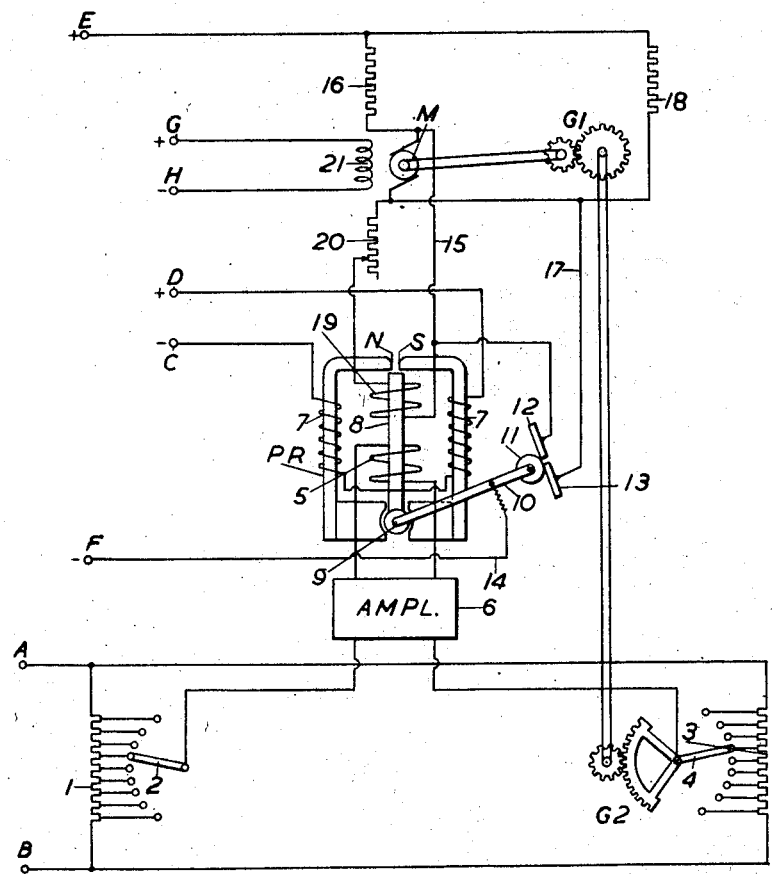
Figure 1 is a diagram of connections showing the invention applied to the control of a motor which operates the resetting element of a servo system.

Referring now to Figure 1, a simple case is shown in which the transmitter of a servo system consists of a potentiometer resistance 1 connected across an alternating or direct current supply voltage at terminals A, B. The sliding contact of the potentiometer 1 is shown as a switch arm 2 which may be moved into any of its positions manually or by some mechanism whose movement is to be repeated. The resetting element also consists of a similar potentiometer 3 connected across the voltage source A, B and whose sliding contact consists of an arm 4 diagrammatically shown as driven from a direct current reversible electric motor M which is geared to the arm 4 through reduction gearing at G1, G2. The requirement is that when the transmitter arm 2 is moved, the arm 4 of the resetting element should follow it precisely without hesitation and without over-shooting. When the two contact arms 2, 4 are in corresponding positions, they are, owing to the form of connection to the voltage source A, B, at the same potentials and, consequently, as the arms 2, 4 are connected to the control winding 5 of a polarised relay PR, no current is applied to that winding when the arm 4 is in the position corresponding to the arm 2.

It is often necessary to interpose an amplifier between the contact arms 2, 4 and the control winding 5 of the relay, and such an amplifier is shown in Figure 1 diagrammatically at 6. The amplifier 6 may be of any convenient form, such as an electronic amplifier or an electro-magnetic amplifier and so forth.

In the example illustrated in Figure 1, the relay PR is a polarised relay polarised by windings 7 on its outer limbs supplied from a direct current source DC, so that at the upper ends of the outer limbs, the polarising flux flows across the gap for example, from the extremity N to the opposite extremity S. The control winding 5 embraces the pivoted armature 8 so that if the current in the control winding 5 flows in such a direction as to cause the flux to flow upwardly in the armature 8, the flux is redistributed so as to be concentrated at the extremity S and the armature 8 is attracted to that extremity and swings clockwise to an extent depending on the magnitude of the control current in the winding 5. If that current is reversed, of course the armature 8 then swings counter-clockwise.

The armature 8 is pivoted about a spindle 9, and fixed to that spindle is a contact arm 10 bearing a contact roller 11. It will be seen that the relay PR is centre-stable so that when no current flows in the control winding 5, the armature 8 and the arm 10 assume a central position, and in that condition, the contact roller 11 bridges a pair of flat fixed contacts 12, 13. Then, a current flows from another direct current source E, F of which the negative terminal F is connected to the roller 11. The path of that current is through the conductor 14 to the moving contact roller 11 into both of the fixed contacts 12, 13. It flows from the contact 12 through the conductor 15 and a current limiting resistor 16; it also flows in parallel from the contact 13 through a conductor 17 and a second current limiting resistor 18 and thence back to the positive terminal E. It will be observed that under these conditions, the motor armature is connected by conductors 15, 17 directly across the fixed contacts 12, 13 and is, therefore, short-circuited by the contact roller 11 and remains at rest.

However, if the roller 11 is slightly disturbed, for example by a small current in the control winding 5, then before the motor M starts, the roller 11 leaves one of the fixed contacts, say the fixed contact 12, and makes contact with the fixed contact 13. Then current flows up through the conductor 17 and, in addition to passing through the resistor 18 also flows upwards through the motor armature M and through the resistor 16. There is, therefore, across the armature M a voltage merely proportional to the resistance of the armature since the motor is not rotating. The voltage across the motor armature M is applied to the feedback winding 19 which also embraces the armature 8 of the relay PR, so that a current flows through the winding 19 as controlled by an adjustable resistor 20. The ampere-turns of the winding 19 oppose those of the control winding 5 and, therefore, cause the armature 8 to swing back and the contact roller 11 to return to the central short-circuiting position and then to overshoot so as to leave the contact 13 and bear upon the contact 12. Then the current flows from the terminal E through the roller contact 11 and the fixed contact 12 and by way of the conductor 15 and now downwards through the motor armature M and back through the resistor 18. Consequently, the voltage drop across the armature M is now reversed and the current in the feedback winding 19 tends to swing the armature back and to return the roller contact 11 towards the contact 13. This process is continuously reversed and by a suitable design of the components with small motors such as are used for resetting servo or follow-up mechanisms, the moving roller contact 11 may vibrate at a frequency of 100 to 200 cycles per second. The result of this is that the roller contact 11 is "alive" and, therefore, in a condition to respond immediately to any signal applied to the control winding 5. Moreover, when that signal is sufficient to cause the motor M to rotate in one direction, a voltage proportional to its speed appears across its brushes as a back electromotive force which thus is applied to the feedback winding 19. The polarity of this voltage is such as to oppose the effect of the original signal in the winding 5, so that under these conditions the current in the winding 19 acts as an anti-hunting signal such as is derived from a stabilising generator in a conventional control system, and it thus prevents excessive over-shooting and hunting.

It will be observed that the motor M is a reversible direct current motor, its field winding 21 being energised from a separate direct current source GH so that the motor is reversed owing to this armature current being reversed upon the contact roller 11 moving from say, the contact 12 to the contact 13.

Figure 2:
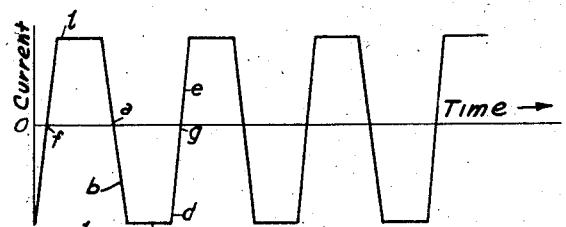
Figure 2 is a current diagram.

In order to explain the operation of the system in greater detail, reference may be made to Figure 2 which shows quite diagrammatically the shape of the current built up in the motor armature when the motor is at rest and the contact roller 11 vibrating equally on both sides of its central position. When the contact roller moves from say, the contact 12 towards the contact 13, the small current flowing in the armature M dies away as the motor armature is short-circuited as indicated, for example by the branch of the curve $a$ and as soon as the contact roller 11 leaves the contact 12 and rests on the contact 13 the current builds up in the opposite direction as shown by the branch of the curve $b$. These branches are actually curved and are determined by the inductance of the armature M. When the current is built up, it remains at a steady value shown by the part of the curve $c$, while the roller 11 rests against the contact 13. Owing to the effect of the feedback winding 19 already described, the roller 11 begins to move back towards the contact 12, and in the central position when the armature M is short-circuited, the current indicated at $c$ begins to fall away, as shown at $d$ and builds up in the opposite direction as shown at $e$. This process goes on continuously and the armature and contacts vibrate, the period of vibration being the time indicated between the points $f$, $g$ in Figure 2.

Figure 3:
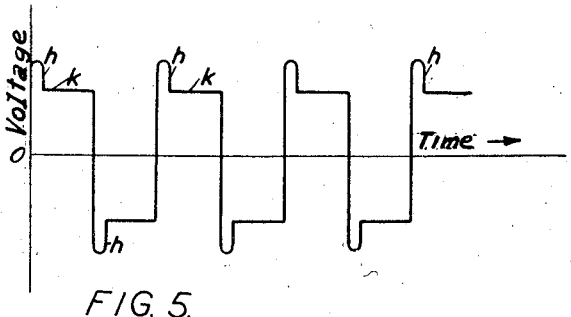
Figure 3 is a voltage diagram to explain the operation of the system when in equilibrium and slightly disturbed therefrom.

Figure 3 shows the corresponding voltage curve across the armature brushes under the above conditions. This curve is made up of two components, one of which is the initial surge $h$ preceding the motor speed-up which represents the rate of change of the current shown in the branches $a$, $b$ and $d$, $e$ in Figure 2, the other component being the parts $k$ which represent the steady drop due to the current through the armature resistance.

Figure 4:
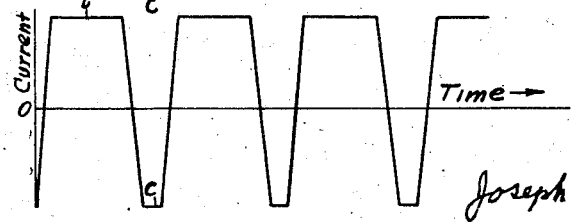
Figures 4 and 5 are corresponding diagrams showing the conditions when the motor is rotating to restore the resetting element.
Figure 5:
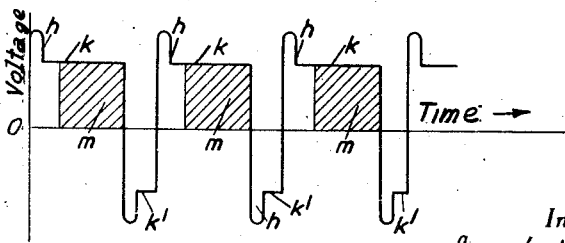

When the motor M is running in one direction caused by the contact roller 11 being predominantly to one side of its central position, for example predominantly on the contact 12, the current curves may be diagrammatically shown as in Figure 4. In that figure, the current $c'$ which flows when the roller 11 is on the contact 13 is shown shortened as compared with Figure 2, and the current of opposite sign as shown at 1 is long in comparison with the same current in Figure 2. The corresponding voltage curve is shown in Figure 5 where the inductive kick $h$ remains as in Figure 3, while the steady parts corresponding to the resistance drop in the armature shown at $k$ are lengthened on the positive side which corresponds to the contact 12. The cross-hatched areas $m$ give an indication of the power available to cause rotation of the motor M in the direction in question. If the signal in the control winding 5 is reversed it is, of course, the negative parts of the voltage curve $k'$ which are elongated, whereas the portions $k$ will be shortened and, therefore, the direction of flow of power is reversed.

Figure 6:
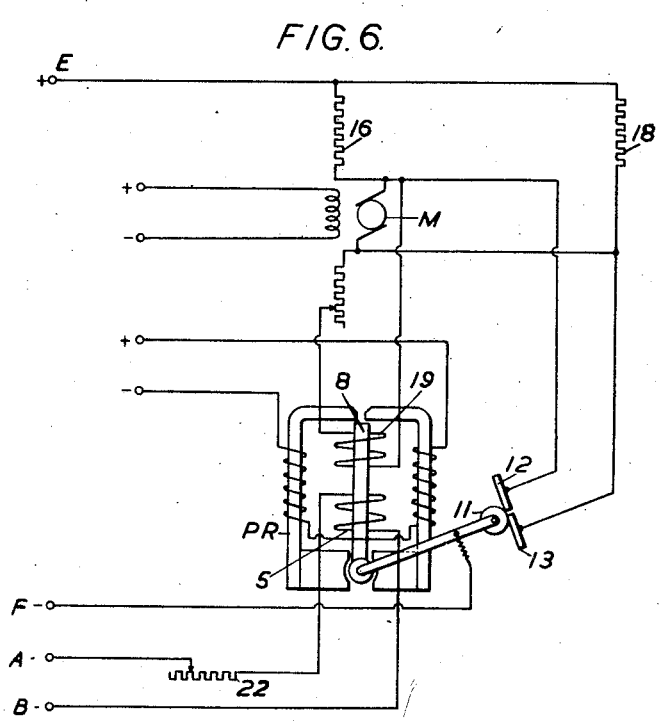
Figure 6 is a diagram of connections showing a system according to the invention arranged to control a reversible motor so that it rotates at a desired adjusted speed.

In the second example shown in Figure 6, a small motor M is required to rotate in either direction at a desired adjusted speed. It is connected to the source of supply EF through resistors 16, 18 as in Figure 1, and the relay PR is arranged and connected in the same way with its contacts 11, 12, 13 connected to short-circuit and control the motor armature M. In this case, however, the control winding 5 receives a steady signal from a source of supply A, B, the current in it being adjustable to provide the desired speed of the motor M by a variable series resistance 22. Then the motor M rotates at a speed such that the back electromotive force causes a current to flow in the feed-back winding 19 which is approximately equal and opposite to that in the control winding 5, assuming that the two windings comprise the same number of turns.

In Figure 6, the windings 5 and 19 are shown as separate windings as in Figure 1, but a more sensitive control of the speed of the motor M may be obtained by using the whole of the winding space around the armature 8 for a signal winding, to which the control signal from the source A, B is applied in series and opposition to the feedback current from the motor M. As a further alternative, the control torque may be applied to the relay armature 8 mechanically by means of a control spring instead of by a control winding 5. The motor M then runs at a speed such that the back electromotive force from the motor armature appearing across the feedback winding of the relay PR produces a torque in the relay equal and opposite to the torque exerted by the said control spring.

I claim:

1. A system for the control of a reversible direct current electric motor, comprising in combination an electromagnetic relay furnished with a signal input winding, a pair of opposite stationary contacts and a movable contact arranged to move between said stationary contacts and to bridge the latter when in its central position, electrical connections from a direct current source of supply respectively to said motor and to said movable relay contact, further electrical connections from said stationary contacts to said motor to provide for reversal of said motor and short-circuit of same when said movable relay contact is in its central position, and a feedback winding mounted on said relay and connected to be energised when said movable relay contact is moved to one side of its central position and operating to return said movable relay contact to the opposite side whereby said movable relay contact is maintained in a condition of continuous vibration of small amplitude.

2. A motor control system according to claim 1, also comprising an adjustable resistor connected in circuit with said feed back winding to provide for adjustment of the feed-back current.

3. A motor control system according to claim 1, wherein said feed-back winding is connected in circuit across the armature winding of the motor and is operative to set said movable relay contact into vibration upon a potential appearing across said armature winding and before said motor begins to move.

4. A motor control system according to claim 1, wherein said electromagnetic relay is a polarised electromagnetic relay, inherently centre-stable.

5. A motor control system according to claim 1, wherein said electromagnetic relay is inherently centre-stable and said movable relay contact is a roller disposed to make contact with both of said opposite stationary contacts when said relay is not energised.

6. An electrically-operated servo system, comprising in combination a transmitter and a receiver including a resetting element, a reversible direct current electric motor mechanically connected to said resetting element, an electromagnetic relay furnished with a signal input winding connected to receive the out-of-balance voltage from the servo system, a pair of opposite stationary contacts and a movable contact arranged to bridge said stationary contacts when in its central position, electrical connections from a direct current source of supply respectively to said motor and to said movable relay contact, further electrical connections from said stationary contacts to said motor to provide for reversal of said motor and short-circuit of same when said movable relay contact is in its central position, and a feedback winding mounted on said relay and connected to be energised when said movable relay contact is moved to one side of its central position and operating to return said movable contact to the opposite side whereby said movable relay contact is maintained in a condition of continuous vibration of small amplitude.

7. An electrically-operated servo system according to claim 6, also comprising an adjustable resistor connected in circuit with said feed-back winding to provide for adjustment of the feed-back current.

8. A motor control system according to claim 1, also comprising means for supplying an adjustable and reversible steady current to said signal input winding in order to maintain the motor running at a desired constant speed.

References Cited in the file of this patent
UNITED STATES PATENTS

| | | |
|---|---|---|
| 2,532,723 | Knoop | Dec. 5, 1950 |
| 2,534,801 | Siltamaki | Dec. 19, 1950 |
| 2,654,859 | Drnek | Oct. 6, 1953 |
| 2,661,449 | Gille | Dec. 1, 1953 |
| 2,674,707 | De Mott | Apr. 6, 1954 |